(12) United States Patent
Smith

(10) Patent No.: US 6,582,012 B1
(45) Date of Patent: Jun. 24, 2003

(54) VEHICLE SEPARATOR PANEL WATER MANAGEMENT SYSTEM

(75) Inventor: Howard H Smith, Holly, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/140,012

(22) Filed: Mar. 28, 2002

(51) Int. Cl.⁷ .................................................. B60R 7/04
(52) U.S. Cl. .................. 296/208; 296/26.11; 296/37.6; 296/190.11
(58) Field of Search ........................... 296/26.08, 26.11, 296/190.08, 191, 208, 146.2, 146.8, 146.16, 37.6, 37.16, 190.11

(56) References Cited

U.S. PATENT DOCUMENTS

| | | | | |
|---|---|---|---|---|
| 3,158,176 A | * | 11/1964 | Toland | 296/208 |
| 3,701,560 A | * | 10/1972 | Emmerson | 296/208 |
| 6,416,104 B1 | | 7/2002 | Fisher et al. | 296/37.16 |
| 6,481,772 B1 | * | 11/2002 | Tenn | 296/26.11 |
| 6,505,872 B2 | * | 1/2003 | Hong | 296/26.11 |
| 2003/0011212 A1 | * | 1/2003 | Hashimoto et al. | 296/190.11 |

OTHER PUBLICATIONS

Patent application USSN 09/757,785 filed Jan. 1, 2001.

* cited by examiner

Primary Examiner—D. Glenn Dayoan
Assistant Examiner—Jason Morrow
(74) Attorney, Agent, or Firm—Laura C. Hargitt

(57) ABSTRACT

A separator panel water management system is provided for a vehicle. The vehicle includes a separator panel positioned within an opening defined between a vehicle interior and a vehicle cargo box. The separator panel is pivotable between a closed position within the opening and an open position away from the opening to allow cargo to extend from the cargo box through the opening into the vehicle interior. A seal is positioned within the opening to seal the separator panel within the opening to prevent water leakage from the cargo box into the vehicle interior. A water management tray is positioned below the opening to receive any water which leaks past the seal into the vehicle interior. The water management tray has at least one channel formed therein to direct the water into at least one hole formed through the tray. A water discharge path is configured to receive water from the hole and to direct the water out of the vehicle interior.

19 Claims, 9 Drawing Sheets

VEHICLE SEPARATOR PANEL WATER MANAGEMENT SYSTEM

BACKGROUND OF THE INVENTION

1. Field of the Invention

The present invention relates to a vehicle separator panel water management system which includes a water management tray which captures water which leaks past a sealed separator panel into a vehicle interior from a cargo box, and a water discharge path which directs the water out of the vehicle interior.

2. Background Art

Many vehicle designs include a rear cargo box which is configured to store cargo for transport. For example, pick-up trucks typically include a cargo box which is separated from the vehicle interior by a permanent divider. In order to add usable cargo storage space to the cargo box, certain new vehicle designs have proposed a pivotable separator panel which separates the vehicle interior from the cargo box. The separator panel is pivotable between a closed position in which the vehicle interior is separated from the cargo box, and an open position in which cargo can extend from the cargo box into the vehicle interior to enhance storage capacity.

A problem associated with such separator panels is that it is difficult to completely seal water out of the vehicle interior. Open vehicle cargo boxes may hold a substantial amount of water, and the leakage of such water past the separator panel could create significant problems within the vehicle interior, such as mold, rust, and destruction of carpeting.

It is possible that leaves, twigs and other debris may get caught between a separator panel seal and a separator panel sealing surface, and such obstructions may temporarily or permanently deform the seal enough to allow water to leak past the seal into the vehicle interior. This is, of course, an undesirable situation which must be addressed before separator panels can be implemented in pick-up trucks or other designs.

SUMMARY OF THE INVENTION

The present invention overcomes the above-referenced problems associated with separator panels by providing a separator panel water management system which captures any water leaking past a separator panel seal into a vehicle interior, and directs the water out of the vehicle interior.

More specifically, the present invention provides a separator panel water management system for a vehicle which includes a separator panel positioned within an opening defined between a vehicle interior and a vehicle cargo box. The separator panel is pivotable between a closed position within the opening and an open position away from the opening to allow cargo to extend from the cargo box through the opening into the vehicle interior. A seal is positioned within the opening to seal the separator panel within the opening to prevent water leakage from the cargo box into the vehicle interior. A water management tray is positioned below the separator panel to receive any water which leaks past the seal into the vehicle interior. The water management tray includes at least one channel formed therein to direct the water into at least one hole formed through the tray. A water discharge path is configured to receive water from the hole and to direct the water out of the vehicle interior.

A floor panel (or floor kick-up panel) is positioned beneath the water management tray and includes a recess therein with an aperture in the recess aligned with the hole in the tray. A check valve is positioned within the aperture to allow water to pass downward through the aperture and to prevent carbon monoxide or debris from entering the vehicle interior through the aperture.

A water management bucket is positioned below the floor panel to receive water from the check valve. The bucket includes a drain hole to direct the water into a body channel which discharges the water outside the vehicle.

The water discharge path is formed by the recess and aperture in the floor panel, the check valve, the bucket and drain hole, and the body channel.

A side trim panel is positioned along each side of the opening adjacent the separator panel. Each side trim panel has a vertical upstanding rib configured to guide water toward the water discharge path. Accordingly, if water leaks past the sides of the separator panel onto the side trim panels, the vertical upstanding ribs guide the water toward the water discharge path to be discharged from the vehicle interior.

The cargo box is also provided with a drain and valve positioned adjacent the separator panel in the cargo box to prevent a substantial head of water from building up against the separator panel.

Another aspect of the invention provides a vehicle with a separator panel as described above, and including a water management tray positioned below the separator panel to receive water which leaks past the separator panel into the vehicle interior. At least one side trim panel is positioned along a side of the opening between the vehicle interior and cargo box adjacent the separator panel. Each side trim panel has a vertical upstanding rib configured to guide water in a direction to be discharged from the vehicle interior. A cargo box drain hole is positioned adjacent the separator panel in the cargo box to drain water away from the separator panel. In this manner, water is managed behind, beneath, and alongside the separator panel.

As used herein, the term "water management system" may refer to the water management tray and hole therein, the recess and aperture in the floor panel, the check valve, the bucket and drain hole, and the body channel and discharge hole. The water management system may also include the side trim panels and their upstanding ribs, and also the cargo box drain hole and valve.

The above objects, aspects, features, advantages, and other objects, aspects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
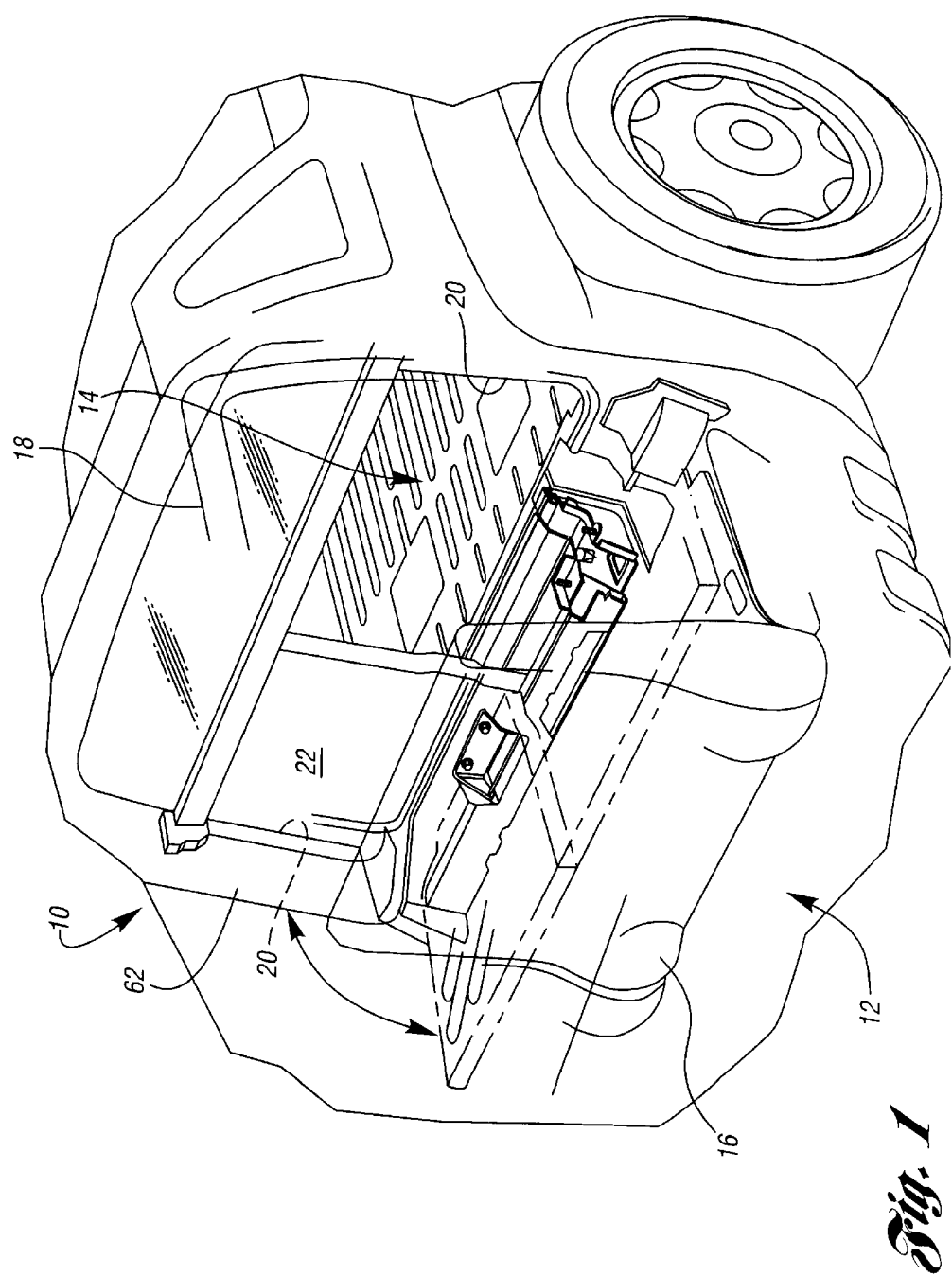
FIG. 1 shows a partially cut-away schematic, perspective view of a separator panel in a vehicle in accordance with the invention.

FIG. 1 shows a vehicle 10, such as a pick-up truck, which includes a vehicle interior 12 and a cargo box 14. The vehicle interior 12 includes seats 16 to accommodate vehicle occupants, and is enclosed by a vehicle roof 18. The cargo box 14 is open to the environment, and is configured to receive and store cargo.

An opening 20 is defined between the vehicle interior 12 and the cargo box 14. A separator panel 22 is positioned within the opening to divide the cargo box 14 from the vehicle interior 12. Approximately one-half of the separator panel is cut-away in FIG. 1 for illustrative purposes. The separator panel 22 is pivotable between a closed position within the opening 20 as shown in FIG. 1, and an open position (shown in phantom in FIG. 1) away from the opening 20 to allow longer cargo items to extend from the cargo box 14 through the opening 20 into the vehicle interior 12. The separator panel 22 is preferably an injection molded or blow molded plastic component which is reinforced with a steel or aluminum understructure.

Figure 2:
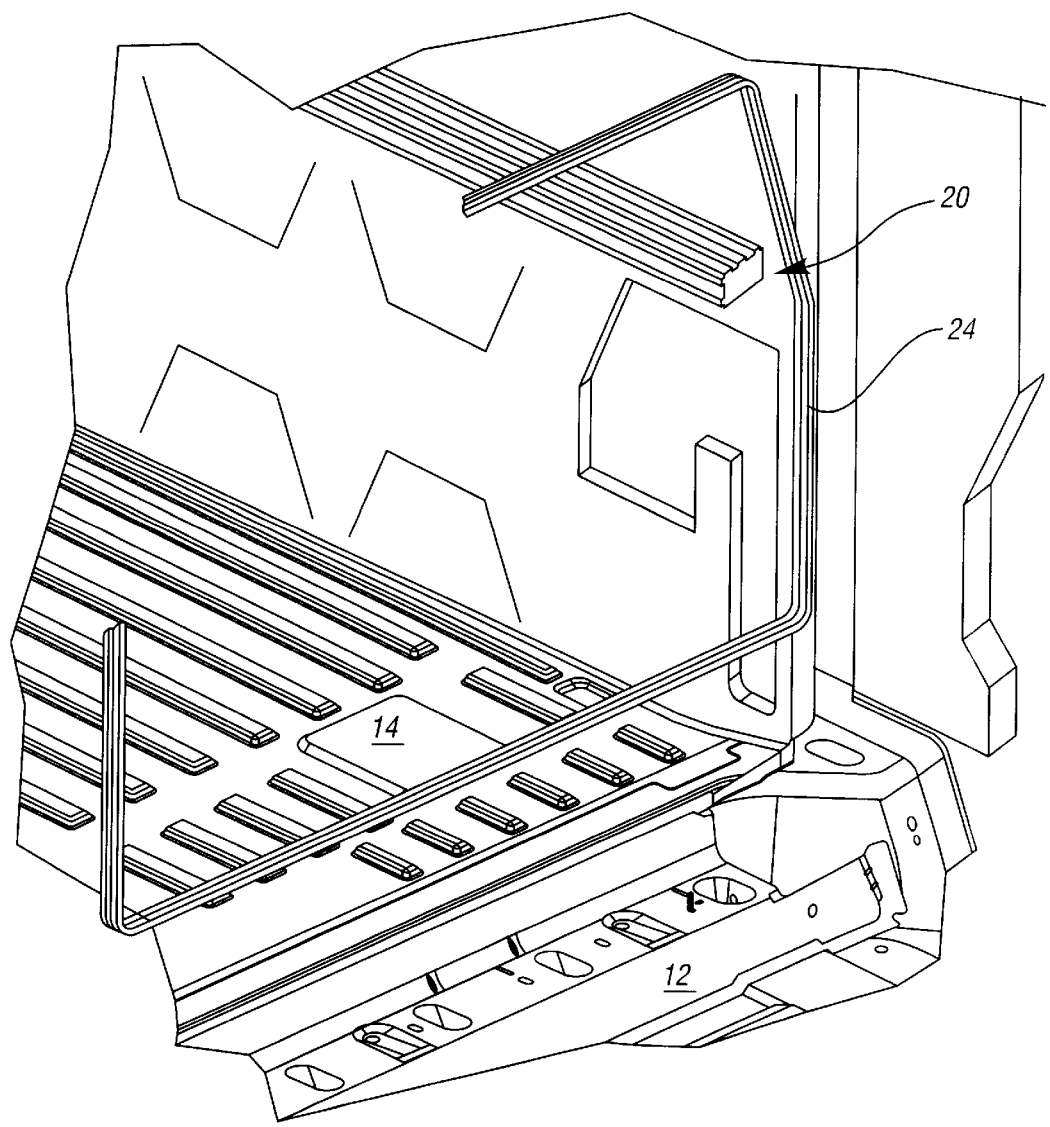
FIG. 2 shows a partial perspective view of a bulb seal within a separator panel opening in a vehicle in accordance with FIG. 1.

Turning to FIG. 2, a bulb seal 24 is shown positioned within the opening 20. The bulb seal 24 is an extended rubber seal which seals the periphery of the separator panel 22 to prevent water leakage from the cargo box 14 into the vehicle interior 12 past the separator panel 22. Any water which leaks past the seal 24, shown in FIG. 2, is captured by a water management system 26, which is shown and described with reference to FIGS. 3 and 4.

Figure 4:
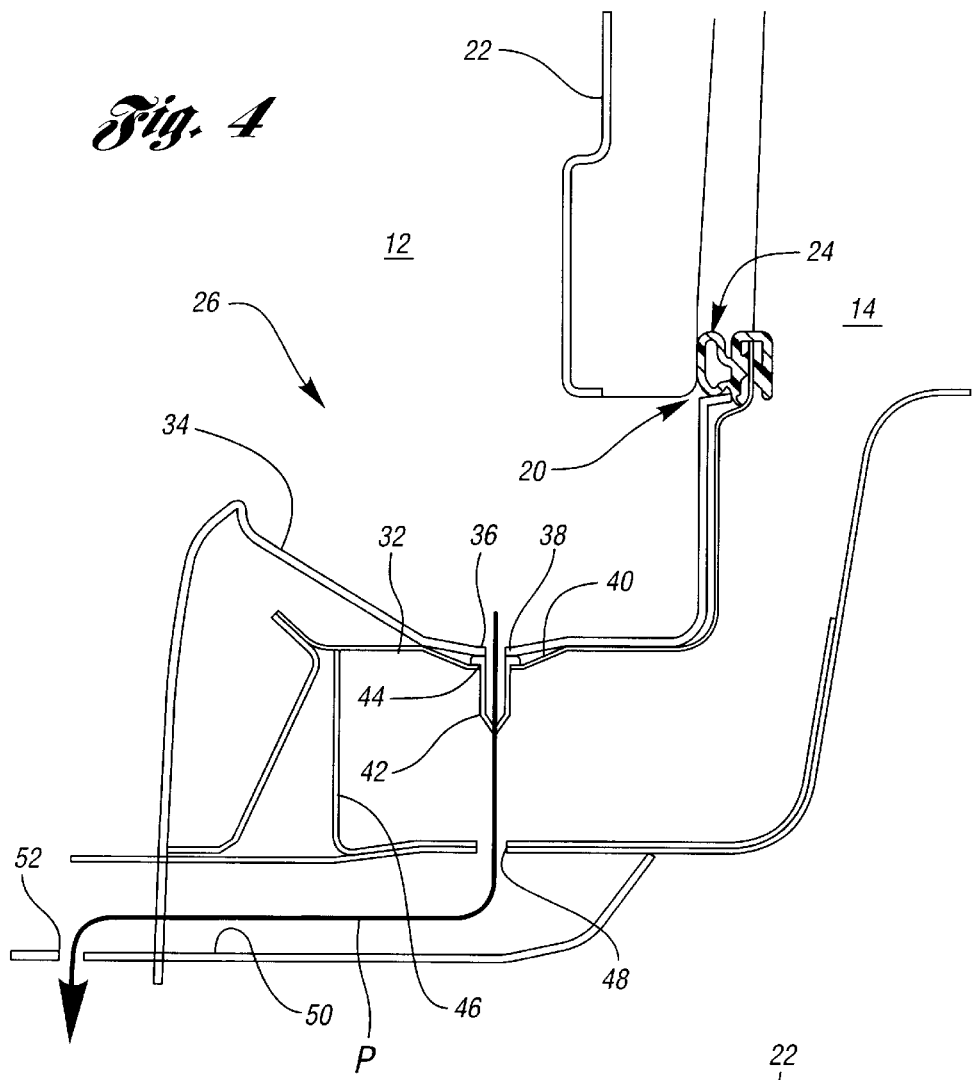
FIG. 4 schematically illustrates a water discharge path through the vertical cross-sectional view of FIG. 3.
Figure 4A:
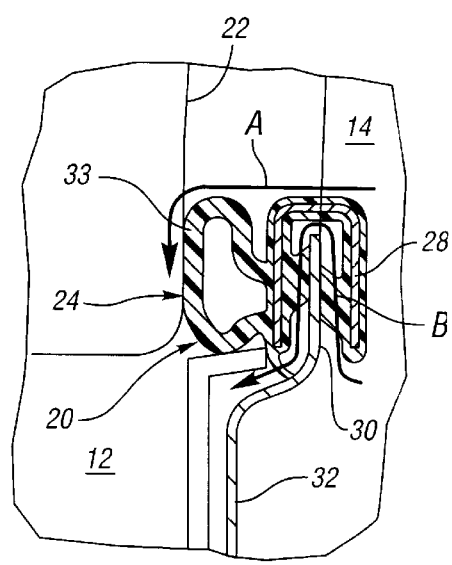
FIG. 4a shows an enlarged, partial vertical cross-sectional view taken from FIG. 4 which schematically illustrates water leakage paths into the vehicle interior.

As shown in FIG. 4a, water may pass from the cargo box 14 into the vehicle interior 12 past the bulb seal 24 via the leakage paths A or B. As shown, the bulb seal 24 has a clip portion 28 which clips onto a rear flange portion 30 of the floor kick-up panel (floor panel) 32. The bulb portion 33 of the bulb seal 24 abuts against the separator panel 22 to seal the opening 20. Water following leakage path A would go over the top of the bulb seal 24 and pass between the bulb portion 33 of the bulb seal 24 and the separator panel 22 to leak into the vehicle interior 12. Such leakage may occur, for example, if a twig or leaf were caught between the bulb seal 24 and the separator panel 22. Via leakage path B, the water would leak through the interior of the clip portion 28 of the bulb seal 24 as illustrated.

Figure 3:
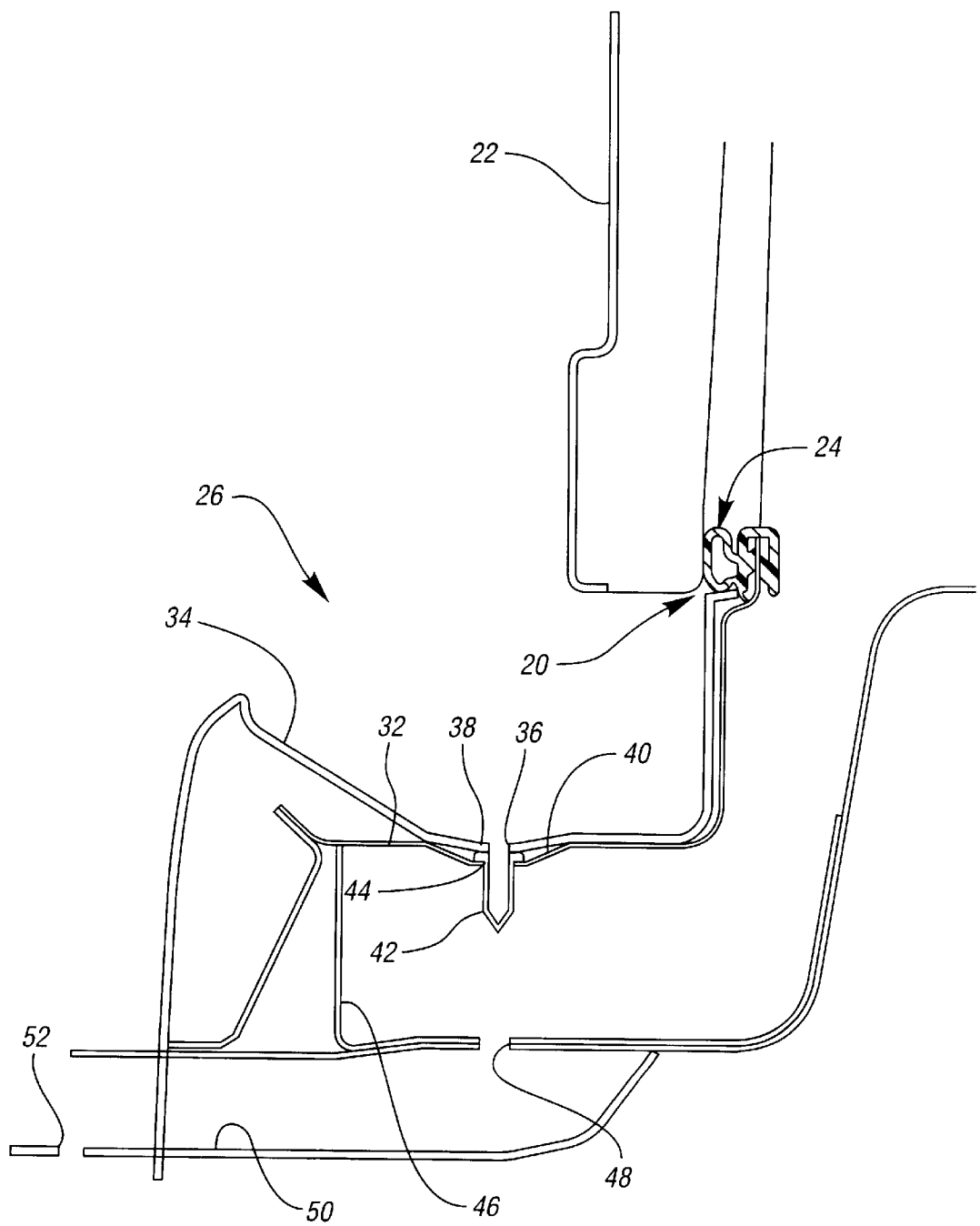
FIG. 3 shows a vertical cross-sectional view of the separator panel and vehicle of FIGS. 1 and 2.

The water following the leakage paths A or B of FIG. 4a enters the vehicle interior 12 and is captured and discharged from the vehicle interior through the water management system 26 of the invention, shown in the various Figures, and particularly shown in FIGS. 3 and 4. The water management system 26 includes a water management tray 34 which is positioned below the opening 20 and the separator panel 22 to receive any water which follows leakage path A shown in FIG. 4a. The water management tray 34 is preferably an injection molded plastic trim component having a class "A" surface, and includes surfaces which slope toward the hole 36 which is formed through the tray 34. Preferably, such sloped surfaces form at least one channel 38 in the tray 34 to direct the water into the hole 36.

Figure 5:
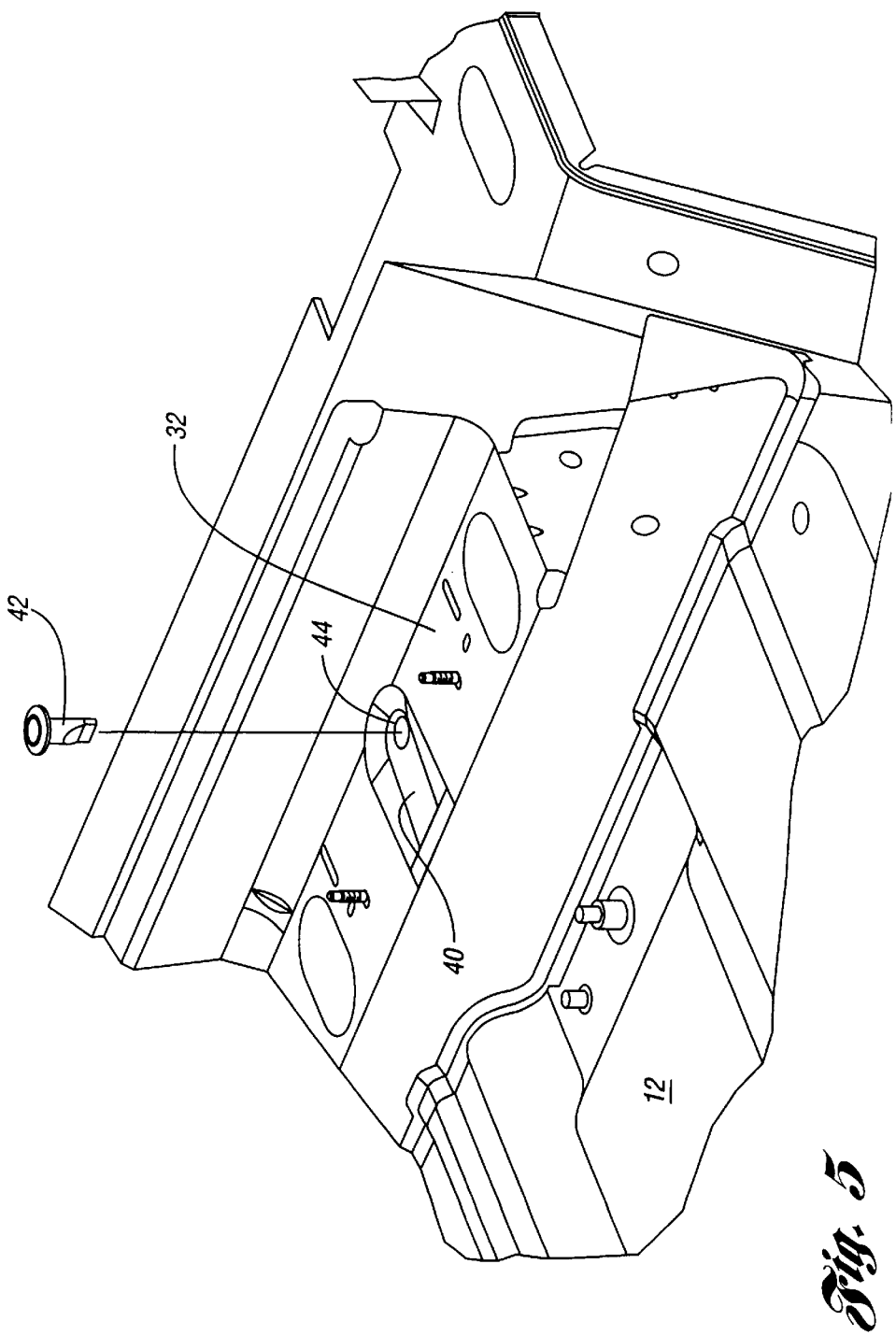
FIG. 5 shows an exploded perspective view of a floor panel and check valve in accordance with FIGS. 1 and 2.

As shown in FIG. 4, the water follows a water discharge path P to exit the vehicle interior. The water discharge path P is defined, in part, by the recess 40 in the floor kick-up panel 32, and the check valve 42 which is positioned within the aperture 44 in the recess 40 in the floor kick-up panel 32. The engagement of the check valve 42 within the aperture 44 is shown in FIG. 5. As shown in FIGS. 3 and 4, the aperture 44 in the floor panel 32 is aligned with the hole 36 in the water management tray 34 such that water collected in the tray 34 passes directly into the check valve 42.

The check valve 42 is preferably a soft, rubber component which allows water to pass downward through the aperture 44, while preventing carbon monoxide or debris from entering the vehicle interior through the aperture 44 and hole 36.

The water discharge path P shown in FIG. 4 is further defined by a water management bucket 46 which is positioned below the floor panel 32 to receive water from the check valve 42. The bucket 46 includes a drain hole 48 to direct the water into a body channel 50 which discharges the water outside the vehicle through a discharge hole 52.

Accordingly, the water discharge path P is defined by the recess 40 and aperture 44 in the floor panel 32, the check valve 42, the bucket 46 and drain hole 48, and the body channel 50 and discharge hole 52. The term "water management system" 26, mentioned above with reference to FIGS. 3 and 4, includes all of the components listed above which define the water discharge path P, and also includes the water management tray 34 described above. The water management system 26 may also include other features to be described below with reference to FIGS. 9–11.

Figure 6:
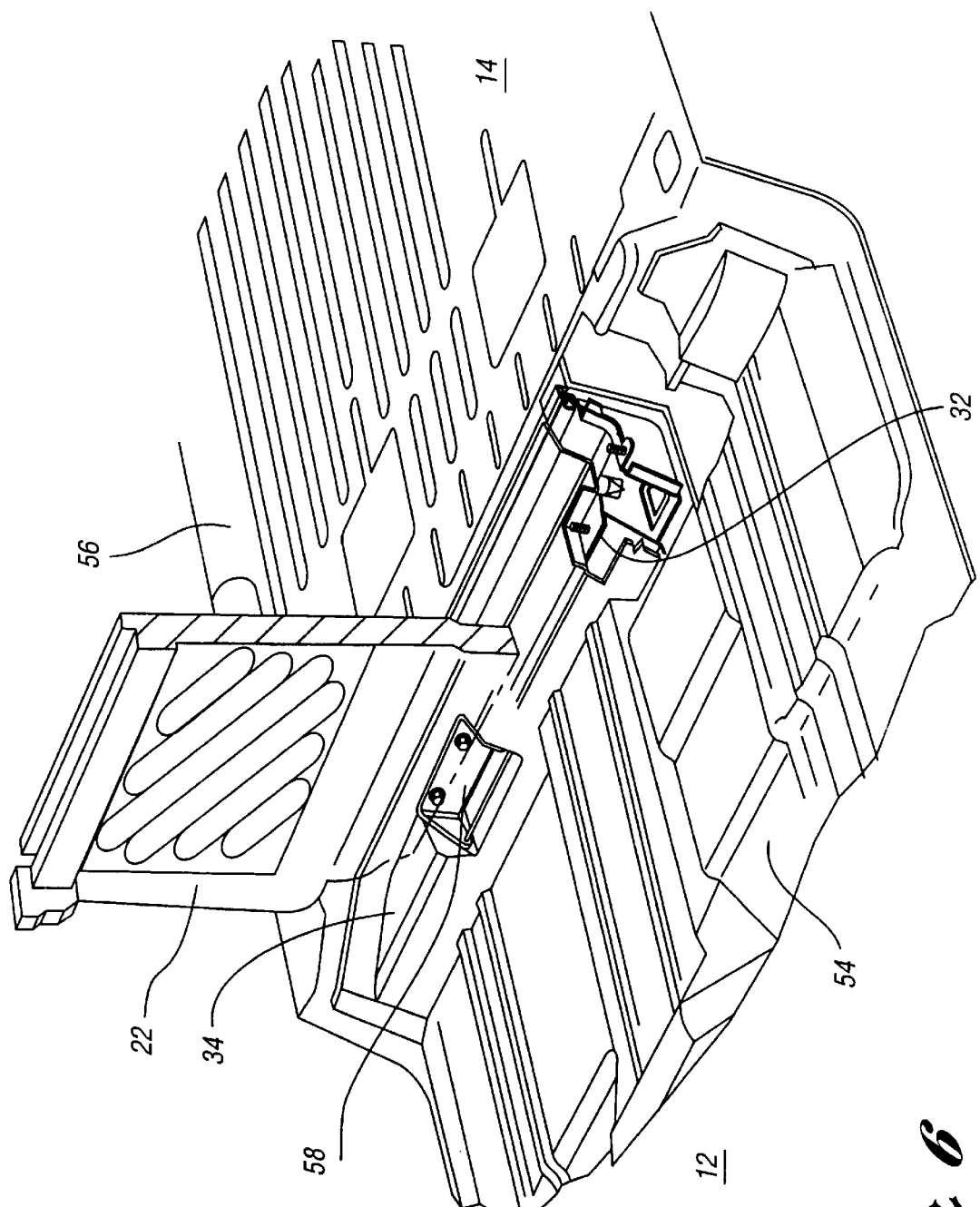
FIG. 6 shows a partially disassembled, partially cut-away perspective view of an intermediate floor panel, cargo box, separator panel, and floor kick-uppanel in accordance with the invention.

FIG. 6 shows a cut-away perspective view illustrating the intermediate floor panel 54, rear floor panel 56, separator panel 22, hinge 58, floor kick-up panel 32, and water management tray 34. Again, the separator panel 22 is only partially shown for illustrative purposes. The hinge 58 pivotably attaches the separator panel 22 to the floor kick-up panel 32 to allow pivotal movement between the open and closed positions illustrated in FIG. 1.

Figure 7:
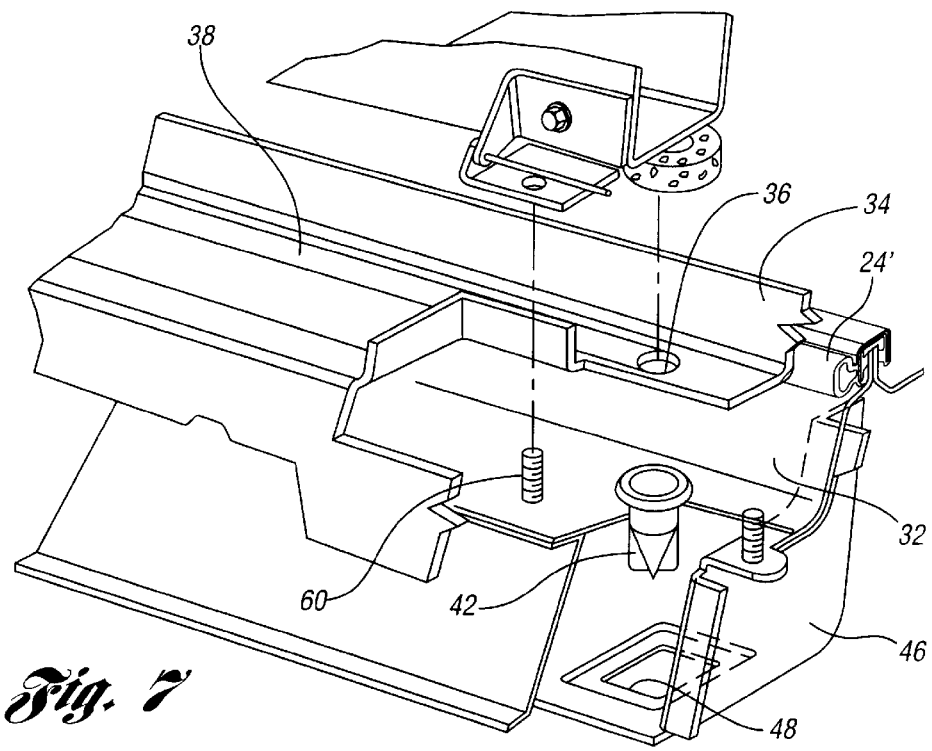
FIG. 7 shows a partially exploded, partially cut-away perspective view of the water management tray, floor kick-up panel, check valve, reinforcement bucket, and drain hole in accordance with the invention.
Figure 8:
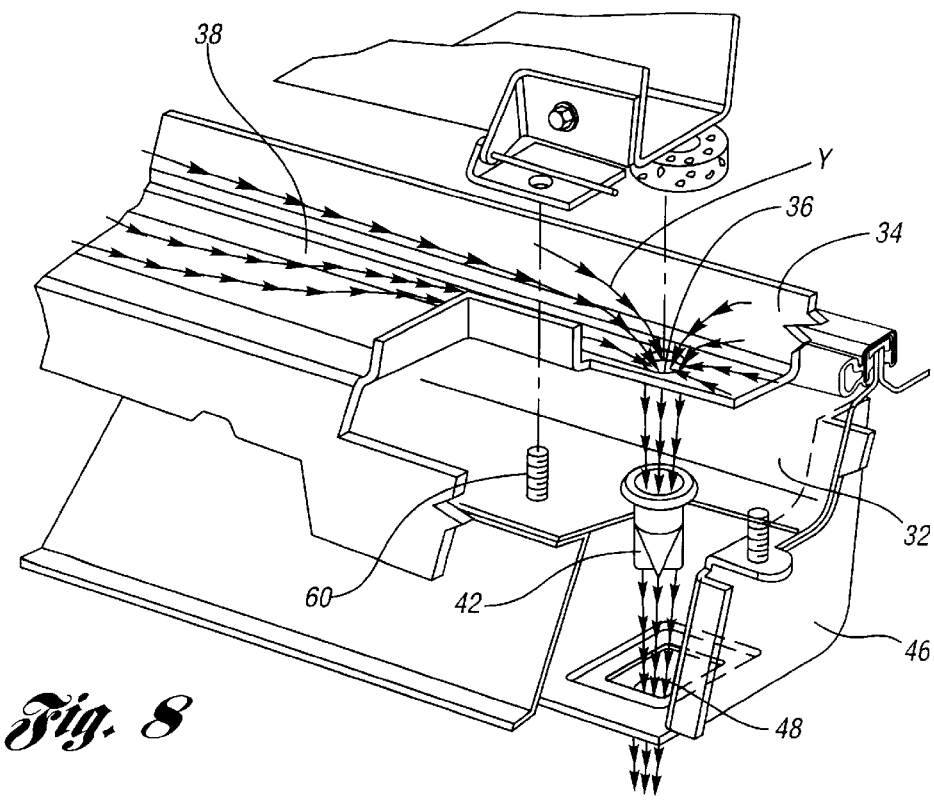
FIG. 8 schematically illustrates a water discharge path through the assembly shown in perspective view in FIG. 7.

FIGS. 7 and 8 further illustrate the relationship between the water management tray 34, floor kick-up panel 32, check valve 42, and water management bucket 46. The water management tray 34 is secured to the floor kick-up panel 32, and abutted by the seal 24', which is shown in a slightly different position than that of FIGS. 3 and 4. As shown, the hole 36 in the water management tray 34 is aligned with the check valve 42. Also, the drain hole 48 in the water management bucket 46 is aligned with the check valve 42 to facilitate water discharge. FIGS. 7 and 8 also illustrate the attachment of the separator panel hinge 59 to the floor kick-up panel 32 via the bolt 60.

The arrows Y shown in FIG. 8 illustrate the capture and flow of water within the water management tray 34. As shown, the channel 38 in the water management tray 34 directs the water to the hole 36. The arrows Y in FIG. 8 also illustrate the water discharge path P through the hole 36, check valve 42, and drain hole 48.

Multiple holes 36 may be provided in the water management tray 34, and such holes may dump water onto the floor kick-up panel 32, which would be sloped or provided with water deflectors to direct the water to the check valve 42 for discharge.

Figure 9:
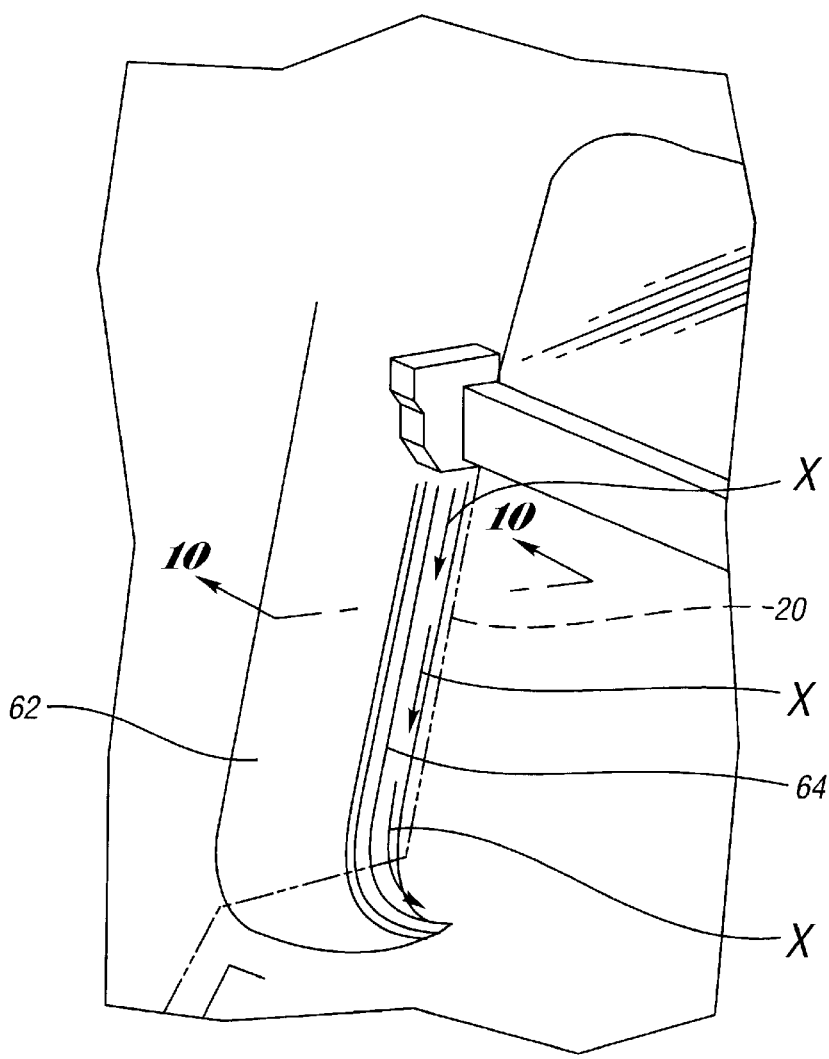
FIG. 9 shows an enlarged perspective view of a side panel taken from detail 9 of FIG. 1.
Figure 10:
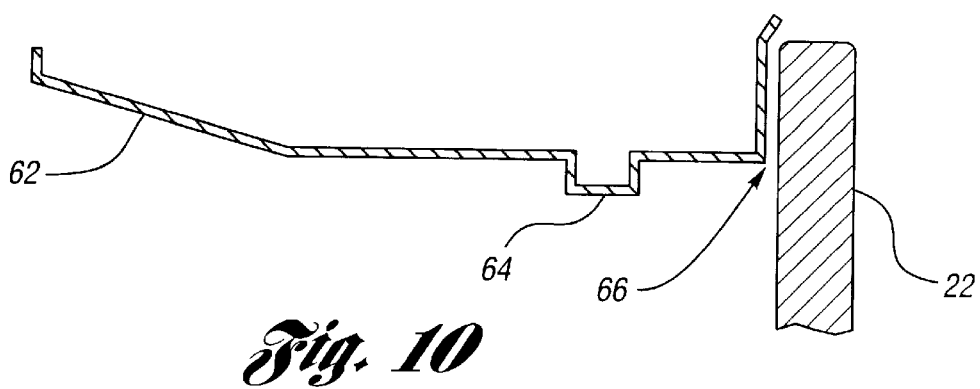
FIG. 10 shows a cross-sectional view taken from line 10—10 of FIG. 9.

Turning to FIGS. 9 and 10, a side trim panel 62 is positioned along each side of the opening 20 adjacent the opposing ends of the separator panel 22. Each side trim panel 62 includes a vertically extending upstanding rib 64, which is configured to guide water toward the water discharge path P. Specifically, referring to FIG. 10, if water leaks past the interface 66 between the separator panel 22 and the side trim panel 62, the rib 64 guides the water downwardly onto the water management tray 34 or onto the floor kick-up panel 32 so that the water may then be directed to the check valve 42 and through the water discharge path P to be discharged outside the vehicle.

As shown in FIG. 9, the water is directed along the direction of the arrows X onto the water management tray 34 or floor kick-up panel 32, and through the check valve 42 for discharge. A mirror image side trim panel is provided along the edge of the opening 20 at the opposite end of the separator panel 22.

Figure 11:
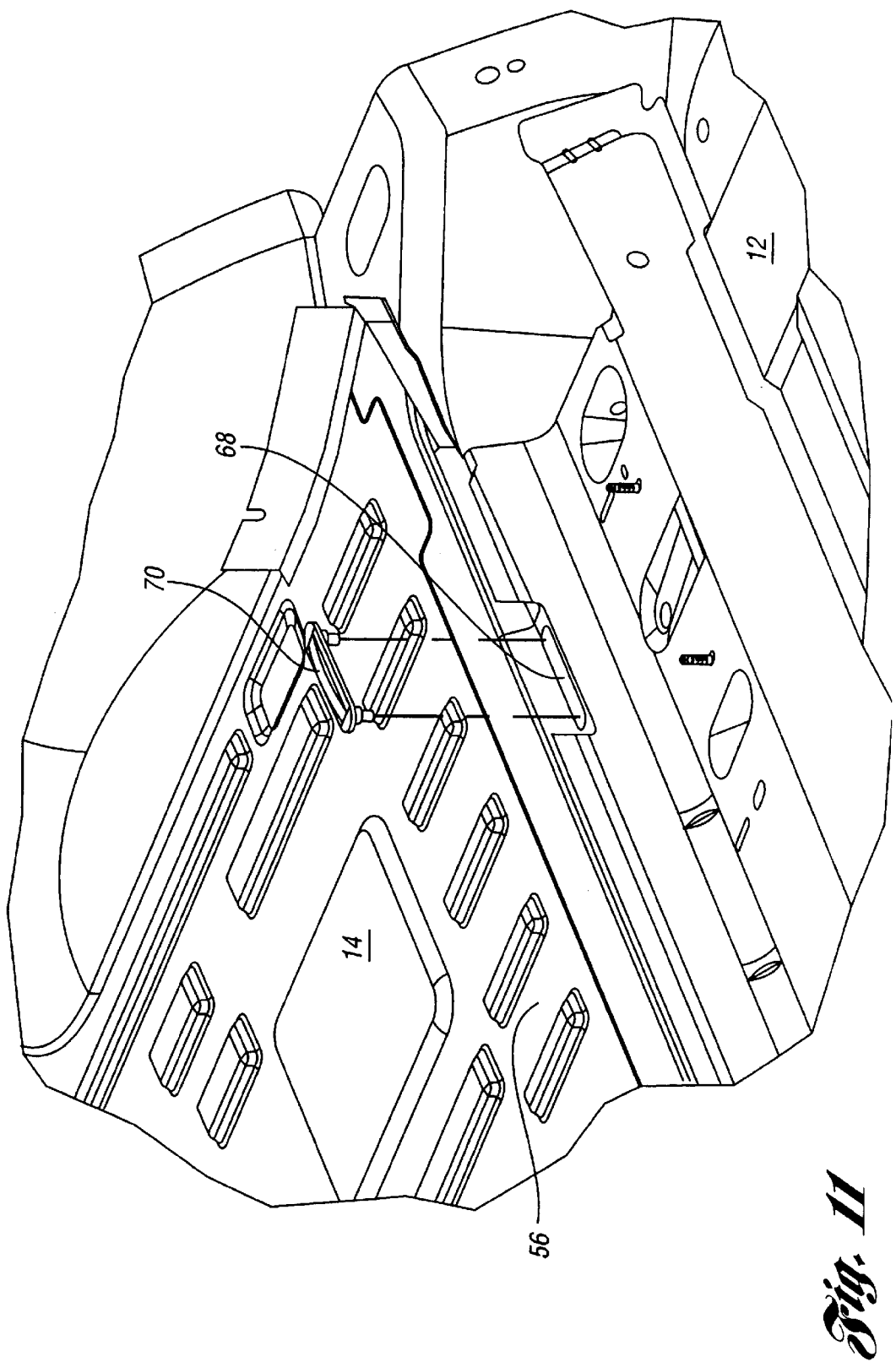
FIG. 11 shows a partially exploded, perspective view of a floor kick-up panel, rear bed, and cargo box drain valve in accordance with the invention.

Turning to FIG. 11, a cargo box drain hole 68 and valve 70 are shown. The cargo box drain hole 68 and valve 70 are positioned in the rear floor panel 56 closely adjacent the separator panel 22 to drain water from the cargo box 14 to prevent a large head of water from building up against the separator panel 22. The valve 70 preferably discharges into the water management bucket 46 shown in FIG. 3 to discharge the water outside the vehicle via the water discharge path P.

As mentioned previously, in addition to the previously listed features of the "water management system", this term may also include the side trim panels 62 and their upstanding ribs, as described above with reference to FIGS. 9 and 10, and also the cargo box drain hole 68 and valve 70. Accordingly, the water management system may include means for managing and discharging water from behind, beneath, and alongside the separator panel 22.

While the best mode for carrying out the invention has been described in detail, those familiar with the art to which this invention pertains will recognize various alternative designs and embodiments for practicing the invention within the scope of the appended claims.

What is claimed is:

1. A separator panel water management system for a vehicle, comprising:
   a separator panel positioned within an opening defined between a vehicle interior and a vehicle cargo box, said separator panel being pivotable between a closed position within the opening and an open position away from the opening to allow cargo to extend from the cargo box through the opening into the vehicle interior;
   a seal positioned within the opening to seal the separator panel within the opening to prevent water leakage from the cargo box into the vehicle interior;
   a water management tray positioned below the separator panel to receive any water which leaks past the seal into the vehicle interior, said water management tray having at least one channel formed therein to direct the water into at least one hole formed through the tray; and
   a water discharge path configured to receive water from said hole and to direct the water out of the vehicle interior.

2. The separator panel water management system of claim 1, further comprising:
   a floor panel beneath the water management tray having a recess therein with an aperture in the recess aligned with said hole in the tray; and
   a check valve positioned within the aperture to allow water to pass downward through the aperture and to prevent carbon monoxide or debris from entering the vehicle interior through the aperture.

3. The separator panel water management system of claim 2, further comprising a water management bucket positioned below the floor panel to receive water from the check valve, said bucket having a drain hole to direct the water into a body channel which discharges the water outside the vehicle.

4. The separator panel water management system of claim 3, wherein said water discharge path is formed by said recess and aperture in the floor panel, said check valve, said bucket and drain hole, and said body channel.

5. The separator panel water management system of claim 1, wherein said seal comprises a bulb seal.

6. The separator panel water management system of claim 1, further comprising at least one side trim panel positioned along a side of the opening adjacent the separator panel, said side trim panel having a vertical upstanding rib configured to guide water toward said water discharge path.

7. The separator panel water management system of claim 1, further comprising a cargo box drain and valve positioned adjacent the separator panel in the cargo box.

8. A separator panel water management system for a vehicle, comprising:
   a separator panel positioned within an opening defined between a vehicle interior and a vehicle cargo box, said separator panel being pivotable between a closed position within the opening and an open position away from the opening;
   a seal positioned within the opening to seal an interface between the separator panel and the opening to prevent water leakage from the cargo box into the vehicle interior;
   a water management tray positioned below the opening to receive any water which leaks past the seal into the vehicle interior, said water management tray being configured to direct the water into at least one hole formed through the tray; and
   a check valve operatively associated with the hole to allow water to drain away from the tray and to prevent carbon monoxide or debris from entering the vehicle interior through the hole.

9. The separator panel water management system of claim 8, further comprising:
   a floor panel beneath the water management tray having a recess therein with an aperture in the recess aligned with said hole in the tray, said check valve being positioned in the aperture.

10. The separator panel water management system of claim 8, wherein said tray comprises at least one channel formed therein to direct the water into said hole.

11. The separator panel water management system of claim 9, further comprising a water discharge path configured to receive water from said hole and to direct the water out of the vehicle interior.

12. The separator panel water management system of claim 11, further comprising a water management bucket positioned below the floor panel to receive water from the check valve, said bucket having a drain hole to direct the water into a body channel which discharges the water outside the vehicle.

13. The separator panel water management system of claim 12, wherein said water discharge path is formed by said recess and aperture in the floor panel, said check valve, said bucket and drain hole, and said body channel.

14. The separator panel water management system of claim 8, wherein said seal comprises a bulb seal.

15. The separator panel water management system of claim 11, further comprising at least one side trim panel positioned along a side of the opening adjacent the separator panel, said side trim panel having a vertical upstanding rib configured to guide water toward said water discharge path.

16. The separator panel water management system of claim 8, further comprising a cargo box drain and valve positioned adjacent the separator panel in the cargo box.

17. A vehicle assembly comprising:

a separator panel positioned within an opening defined between a vehicle interior and a vehicle cargo box, said separator panel being pivotable between a closed positioned within the opening and an open position away from the opening to allow cargo to extend from the cargo box through the opening into the vehicle interior;

a seal positioned within the opening to seal the separator panel within the opening to prevent water leakage from the cargo box into the vehicle interior; and a water management system configured to receive any water which leaks past the seal into the vehicle interior and to direct the water out of the vehicle interior.

18. The vehicle of claim 17, wherein said water management system comprises:

a water management tray positioned below the opening to receive said water which leaks past the seal into the vehicle interior, said water management tray having at least one channel formed therein to direct the water into at least one hole formed through the tray; and a water discharge path configured to receive water from said hole and to direct the water out of the vehicle interior.

19. A vehicle including a vehicle interior and a cargo box with an opening defined between the vehicle interior and the cargo box, and a separator panel pivotably positioned within the opening to selectively separate the cargo box from the vehicle interior, the vehicle further comprising:

a water management tray positioned below the separator panel to receive water which leaks past the separator panel into the vehicle interior;

at least one side trim panel positioned along a side of the opening adjacent the separator panel, each said side trim panel having a vertical upstanding rib configured to guide water in a direction to be discharged from the vehicle interior; and a cargo box drain positioned adjacent the separator panel in the cargo box to drain water away from the separator panel.

* * * * *